United States Patent [19]

Makowski et al.

[11] 4,179,422

[45] Dec. 18, 1979

[54] ELASTOMERIC BLEND COMPOSITIONS OF A SULFONATED ELASTOMER POLYMER AND A CRYSTALLINE POLYOLEFINIC THERMOPLASTIC RESIN

[75] Inventors: Henry S. Makowski, Scotch Plains; Charles P. O'Farrell, Clark, both of N.J.

[73] Assignee: Exxon Research & Engineering Co., Florham Park, N.J.

[21] Appl. No.: 855,772

[22] Filed: Nov. 29, 1977

[51] Int. Cl.$^2$ .............................................. C08L 91/00
[52] U.S. Cl. ......................... 260/28.5 B; 260/31.2 R; 260/33.6 AQ; 260/42.33; 260/42.47; 260/DIG. 31
[58] Field of Search .................. 260/33.6 AQ, 28.5 B, 260/889, 42.33, 31.2 R, 878 R, 879, 42.47

[56] References Cited

U.S. PATENT DOCUMENTS

| | | | |
|---|---|---|---|
| 3,974,240 | 8/1976 | Bock et al. | 260/897 B |
| 3,974,241 | 8/1976 | Lundberg et al. | 260/897 B |
| 4,007,149 | 2/1977 | Burton et al. | 260/29.7 B |

*Primary Examiner*—Lewis T. Jacobs
*Attorney, Agent, or Firm*—Richard E. Nanfeldt

[57] ABSTRACT

This invention relates to blend compositions of thermoplastic resins and a neutralized sulfonated elastomeric polymer and a hydroxyalkyl carboxylate ester wherein the resultant composition has both improved physical and rheological properties such as compression set for blends exhibiting elastomeric characteristics and impact strength for blends exhibiting thermoplastic characteristics.

31 Claims, No Drawings

ELASTOMERIC BLEND COMPOSITIONS OF A SULFONATED ELASTOMER POLYMER AND A CRYSTALLINE POLYOLEFINIC THERMOPLASTIC RESIN

BACKGROUND OF THE INVENTION

1. Field of the Invention

This invention relates to blend compositions of a neutralized sulfonated elastomeric polymer, a hydroxyalkyl carboxylate ester and a thermoplastic resin wherein the resultant composition has both improved physical and rheological properties such as compression set for blends exhibiting elastomeric characteristics and impact strength for blends exhibiting thermoplastic characteristics.

2. Description of the Prior Art

The blend compositions of the present instant invention relate to compositions having improved physical and rheological properties for fabrication on conventional type fabricating equipment.

The hydroxyalkyl esters of this invention may be schematically represented as follows:

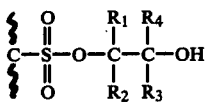

wherein ∼C∼ is one or more carbon atoms in one or more molecules comprising a polymer and is in the polymer backbone chain of carbon atoms or is in an acyclic, alicyclic, or aromatic group which is pendant to the backbone chain; $R_1$, $R_2$, $R_3$ and $R_4$ are independently selected from the group consisting of hydrogen, $C_1$ to $C_{18}$ straight and branched chain acyclic, alicyclic, aryl, alkylaryl, arylalkyl groups and functional derivatives thereof.

Products which have a limited concentration of ionic groups covalently bonded to one or more carbon atoms of one or more molecules comprising a polymer, when partially or completely neutralized with mono or polyvalent cations such as sodium, zinc, magnesium, lead, ammonium and quaternary ammonium compounds are generally referred to as ionomers. The ionic groups can be covalently bonded to carbon atoms comprising the backbone chain of the polymer, which chain of carbon atoms may be interrupted by hetero atoms such as oxygen, nitrogen and sulfur, or the ionic groups can be bonded to acyclic, alicyclic, or aromatic groups which are pendant to the backbone chain. Solid, gel-free ionomers differ from covalently crosslinked elastomers, such as vulcanized rubber, in that while ionomers can be elastomeric at ordinary temperatures, at elevated temperature they can be extruded, compression molded, blow molded, sheeted, vacuum formed and injection molded.

Sulfonated polymers are known to be relatively unstable and are difficult to process in safety or without degradation in conventional plastic or rubber equipment at elevated temperatures. Except for this tendency to degrade it would be advantageous to process the free acid since the weak ionic associations result in a low polymer viscosity permitting easy mixing with neutralizing agents, extender oils, plasticizers, and other polymers. Such oil extended systems can then be reacted with the neutralizing agent which is an amine or metallic or quaternary base such as an oxide or hydroxide or salt of a weak acid such as an acetate or stearate to yield the ionomer.

On the other hand, if the sulfonated polymer is first neutralized with a counterion and the ionomeric product isolated it is found to possess an extraordinarily high viscosity even at elevated temperatures commonly used for processing thermoplastic polymers in conventional equipment and must be mixed with other materials by solution techniques.

A major object of the instant invention is to provide a selected class of ionomers which can be blended with a minor amount of a thermoplastic resin to provide elastomeric blend compositions having superior physical and rheological properties.

Another major object of the instant invention is to provide a selected class of ionomers which can be blended in a minor portion into a thermoplastic resin for modulation and improvement of the physical properties of the thermoplastic resin.

A more specific object of the present invention is to provide solid, gel-free blend compositions of a neutralized sulfonated polymer, a crystalline polyolefinic thermoplastic and a hydroxyalkyl carboxylate ester, wherein the composition has improved processability on conventional plastic fabricating equipment as well as improved physical properties such as compression set. These, and other objects of this invention will be further apparent in the detailed description of the invention which follows below.

The reaction of an oxirane (e.g. ethylene oxide) with a sulfonic acid to form a hydroxyethyl ester is old in the art. U.S. Pat. No. 2,208,581 discloses the preparation of surface active agents by the reaction of low molecular weight sulfonic acids with a compound containing an olefin oxide.

In a first copending application concerning preparation of ionomeric latex epoxides are used to quench the sulfonation reaction and allow the cement to be processable in a unique latex process. However, this copending application fails to teach a method for the isolation of a solid, gel-free, hydrolytically stable polymeric hydroxyalkyl sulfonate having desirable physical and rheological properties, wherein these polymeric sulfonates are readily convertible to metal sulfonate during and after processing thereby permitting fabrication on conventional type equipment to a variety of useful articles. Furthermore, it is completely unpredictable that a solid, gel-free hydrolytically stable polymeric hydroxyalkyl sulfonate is capable of being isolated in a steam stripping operation under acidic conditions and at higher temperatures based upon the published literature on the hydrolytic stability of low molecular weight alkyl sulfonates. No references have been found in the chemical or patent literature for the preparation of hydroxyalkyl esters of polymeric sulfonic acids or for the preparation of ionomers from these esters by reaction with a basic compound or salt of an acid having a lower $K_a$ than the sulfonic acid.

In another copending application entitled "Polymeric Hydroxyalkyl Sulfonates" (U.S. Ser. No. 855,763 filed Jan. 29, 1977), the preparation of polymeric hydroxyalkyl sulfonates are described wherein an acid form of a sulfonated polymer is reacted with an oxirane having the general formula:

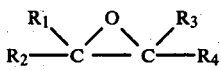

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. The improved blend compositions of the present instant invention provide materials of superior physical and rheological properties.

U.S. Pat. No. 3,974,240 and 3,974,241 teach the blend compositions of a crystalline polyolefinic thermoplastic and a neutralized sulfonated elastomeric polymer. These applications differ from the present application both in their method of manufacturing and their resultant composition. The use of the hydroxyalkyl carboxylate ester as a plasticizer in the blend composition results in definite improvements in processability on conventional type plastic fabricating equipment. In the present invention the polyolefinic thermoplastic is blended with the sulfonated polymer prior to neutralization wherein a molecular entanglement of the polymeric chains of the sulfonated polymer and the polyolefinic polymer is achieved thereby resulting in improved physical properties.

SUMMARY OF THE INVENTION

It has been found surprisingly that solid, compositions can be formed from blends of neutralized sulfonated elastomeric materials, in particular a select class of neutralized sulfonated elastomeric polymers, a polyolefinic thermoplastic and a hydroxyalkyl carboxylate ester having suitable rheological and physical properties for the formation of elastomeric and thermoplastic articles by an extrusion process.

Accordingly, it is an object of our present invention to provide unique and novel solid, compositions of matter by a unique and novel process for producing a high performance elastomeric or thermoplastic article by an extrusion or injection molding process, wherein the compositions have improved processability on conventional plastic-type fabricating equipment.

It is the object of the instant invention to describe a class of blend compositions based on sulfonated ethylene-propylene terpolymers, a thermoplastic resin, and a hydroxyalkyl carboxylate ester which can be processed on plastics type extrusion equipment at high rates and which possess improved physical characteristics such as low temperature flexibility, compression set and a rubbery-feel for compositions having elastomeric characteristics and impact and tensile strength properties for compositions having thermoplastic characteristics.

When the thermoplastic resin is present in the minor amount and is at least partly crystalline the resultant blends have high tensile strengths and elongations at room temperature. In many cases the blends are greatly superior in physical properties to those of the neutralized hydroxyalkyl sulfonate alone. At elevated temperatures the tensile properties of the blends are often substantially above that of the neutralized hydroxyalkyl sulfonate alone, demonstrating the higher use temperature of these blends.

One of the essential aspects of the present invention comprises the discovery that only a restricted class of the neutralized sulfonated elastomers may be readily employed for extrusion fabrication of compositions having elastomeric and thermoplastic characteristics. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as extrusion to form articles which can be classified as sheet, profiles, tubing and film. The applications employing these fabrication techniques such as windshield wipers, weather stripping, refrigerator door seals, garden hose, etc. require materials which are flexible and tough. Two broad classifications of materials which have been used are vulcanized elastomers and plasticized thermoplastics such as polyvinyl chloride (PVC). The fabrication of extruded articles based on vulcanized elastomers is a major item of cost involving the vulcanization procedure. Not only is this step costly from an energy intensive viewpoint, but it is time consuming. The use of plasticating extrusion for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics type extrusion equipment at conventional plastics rates and which possess the flexibility and subjective rubbery characteristics of vulcanized elastomers.

GENERAL DESCRIPTION

This present invention relates to unique and novel blend compositions of a neutralized sulfonated elastomeric polymer, a thermoplastic resin and a hydroxyalkyl carboxylate ester, wherein the compositions are readily processable in a conventional extrusion or injection molding process into a high performance elastomeric or thermoplastic articles such as wire coatings, bottles, appliance housing and similar applications. The resultant elastomeric articles have excellent low and elevated temperature flexibility, excellent flex fatigue, superior dimensional stability, good resilience, and a rubber-like feel. The resultant thermoplastic articles have excellent low and elevated temperature tensile properties, improved flexibility and superior impact properties.

The neutralized sulfonated elastomeric polymers of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, styrene-butadiene copolymers or isoprenestyrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, more preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene and about 43.5 wt. % of propylene.

The EPDM terpolymers of this invention have a number average molecular weight ($\overline{M}n$) of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

In carrying out the invention, the elastomeric polymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about $-10°$ C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon or even in the absence of solvent.

The amount of desirable sulfonation depends on the particular application. Preferably, the elastomeric polymer is sulfonated at about 10 to about 60 meq. $SO_3H/100$ g of polymer, more preferably at about 15 to about 50 meq. $SO_3H/100$ g of polymer, and most preferably at about 20 to about 40 meq. $SO_3H/100$ g of polymer. The meq. of $SO_3H/100$ g of polymer was determined by dissolving the acid form of the sulfonated polymer is a mixed solvent of 95 parts toluene and 5 parts methanol at a concentration level of 50 grams per liter of solvent. The acid form is titrated with sodium hydroxide in ethanol to an Alizarin-Thymolphthalein endpoint. Sulfur analysis was determined by Dietert Analysis.

It should be pointed out that neither the sulfonating agent nor the manner of sulfonation is critical, provided that the sulfonating method does not degrade the polymer backbone. The sulfonation reaction can be terminated and the sulfonated polymer converted to a hydroxyalkyl ester by the addition of an oxirane to the reaction mixture, or the sulfonated polymer recovered by precipitation for example with a polar solvent such as methanol or acetone, and after removal of the polar solvent, redissolved in a non-reactive solvent and converted to the hydroxyalkyl ester by reaction with an oxirane.

Oxiranes which are suitable for the practice of this invention have the general formula:

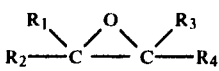

wherein $R_1$, $R_2$, $R_3$ and $R_4$ are independently selected from the group consisting of hydrogen and $C_1$ to $C_{18}$ straight and branched chain acylic, alicyclic, aryl, alkylaryl, arylalkyl radicals and functional derivatives thereof. Nonlimiting examples of suitable oxiranes include ethylene oxide, propylene oxide, allyl glycidyl ether, styrene oxide, epichlorohydrin and epoxidized methyl oleate.

Ethylene glycol, propylene glycol and their monomethyl or monoethyl ethers are useful as their mono sodium or potassium salts for the preparation of the hydroxyalkyl esters from polymers which have been chlorosulfonated.

In accordance with this invention, polymers having sulfonic acid groups covalently linked to carbon atoms comprising the polymer can be reacted with an oxirane to yield hydroxyalkyl esters which are free of acid and can be isolated as for example by steam stripping or precipitation with a polar solvent and the product dried, mixed, compounded and the gel-free, hydroxyalkyl sulfonate partially or completely converted to the metal sulfonate to form an ionomer by mixing with a mono or polyvalent basic compound or salt of an acid having a lower $K_a$ than the sulfonic acid in conventional equipment without decomposition or corrosion. The hydroxyethyl esters are:

(1) Stable to hydrolysis under steam stripping conditions;

(2) Thermally stable at the temperatures used in processing thermoplastic and elastomeric materials;

(3) Convertible to an ionomer by mixing in bulk with a basic compound or salt of a weak acid, followed by the application of heat; and (4) Permits the preparation of ionomers which are free of acid when less than the stoichiometric quantity, based on the sulfonic acid content, of a basic compound or salt is used to convert the ester to an ionomer.

The hydroxyalkyl sulfonates are gel-free. Gel is measured by stirring a given weight of polymer in a solvent comprised of 95 toluene/5-methanol at a concentration of 5 wt. %, for 24 hours, allowing the mixture to settle, withdrawing a weighed sample of the supernatant solution and evaporating to dryness.

The products and the process of this invention thus avoid all of the difficulties associated with working with the free acid or solution neutralized products.

The process comprises dissolving the polymer at a concentration in the range of about 3 to about 25 wt. % of a non-reactive solvent, sulfonating the polymer to the desired degree with an appropriate sulfonating agent, reacting the sulfonated polymer, either before isolation or after isolation and purification in a solvent with an appropriate oxirane, separating the reaction product of the sulfonated polymer with the oxiranes from the solvent and converting said reaction product to an ionomer by reaction with about 10 to more than 100% of the stoichiometric proportion of a metallic base or salt of an acid having a lower $K_a$ than the sulfonic acid, based on the sulfonic acid content of said sulfonated polymer, and recovering said ionomer.

The hydroxyalkylated sulfonate is recovered from the cement by conventional steam stripping methods. The solid, gel-free hydroxyalkyl sulfonate is blended with a polyolefinic thermoplastic resin or a combination of a filler and the polyolefinic thermoplastic by techniques well known in the art. For example, the blend composition can be dry compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing type equipment. The Banbury mixing device is the preferred batch type mixer, and the twin screw extruder is the preferred continuous mixer.

In the preparation of the elastomeric blend compositions of the instant invention a major proportion of the neutralized sulfonated elastomeric polymer and the hydroxyalkyl sulfonate is blended with a minor proportion of the thermoplastic resin. The preferred range of the thermoplastic resin is about 5 to about 90 parts by weight per 100 parts of the neutralized sulfonated elastomer, more preferably about 10 to about 75, and most preferably about 15 to about 50. In the preparation of the thermoplastic blend compositions of the instant invention a minor proportion of the neutralized sulfonated elastomeric polymer is blended with a major proportion of the thermoplastic resin. The preferred range of the thermoplastic resin is about 120 to about 900 parts by weight per 100 parts of the neutralized sulfonated elastomeric polymer, more preferably about 150 to about 400 and most preferably about 150 to about 300.

The fillers employed in the present invention are selected from carbon blacks, alumino-silicates, talcs, calcium silicate, ground calcium carbonate, water precipitated calcium carbonate, magnesium silicate, or delaminated, calcined or hydrated clays and mixtures thereof. Examples of carbon black are acetylinics, furnace, channel or lamp blacks. These fillers are incorporated into the blend composition at about 0 to about 300 parts by weight per hundred of the neutralized sulfonated elastomeric polymer, more preferably at about 0 to about 250 and most preferably at about 0 to about 200. Typically, these fillers have a particle size of about 0.03 to about 15 microns, more preferably about 0.5 to about 10 and most preferably about 2 to about 10. The oil absorption as measured by grams of oil absorbed by 100 grams of filler is about 10 to about 70, more preferably about 10 to about 50 and most preferably about 10 to about 30. Typical mineral fillers employed in this invention are illustrated in Table I.

The thermoplastic resins of this invention are selected from one of the following groups of resins: (1) crystalline polyolefinic thermoplastic resins such as high and low density polyethylene, polypropylene, poly-1-butene, ethylene-alpha-olefin copolymers, such as crystalline ethylene-propylene copolymers, and trans-1,4-polybutadiene; (2) essentially non-crystalline vinyl polymers and copolymers such as polystyrene, styrene-acrylonitrile copolymers, and ABS resins; (3) at least partly crystalline condensation polymers such as the polyamides, for example, Nylon-6,6, polysulfones, and polyesters.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03-0.4 | 9.3 |
| Delaminated clay | Polyfil DL | 30 | 2.61 | 4.5 | 6.5-7.5 |
| Hydrated clay | Suprex | | 2.6 | 2 | 4.0 |
| Calcined clay | Icecap K | 50-55 | 2.63 | 1 | 5.0-6.0 |
| Magnesium silicate (talc) | Mistron Vapor | 60-70 | 2.75 | 2 | 9.0-7.5 |

The crystalline polyolefinic thermoplastic resins employed in the solid, gel-free blend compositions are characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$-$C_4$ alpha-olefins. Most preferably the polyolefins are selected from the group consisting of polyethylene, polybutene, polypropylene, and ethylenepropylene copolymers. It is important that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

The crystalline polyolefin which is blended with the above described sulfonated elastomers is preferably selected from the group consisting of low, medium and high density polyethylene, polypropylene, and ethylene-propylene copolymers. These polymers are characterized as having a degree of crystallinity of at least 25%, preferably at least 40%. The crystalline polyolefin will also have a melting point of at least 50° C., preferably at least 70° C. The crystalline polyolefin is blended with the neutralized sulfonated elastomeric polymer described above at a level of at least 5 parts per hundred, preferably from 10 to 75 parts per hundred, and more preferably from 15 to 50 parts per hundred of sulfonated polymer for elastomeric articles.

The crystalline polyolefins suitable for this invention can vary greatly in molecular weight ($\overline{M}n$) from as low as 2000 up to and exceeding 200,000. The preferred molecular weight range is from 4000 to 150,000. If the molecular weight of the polyolefin is too low, the crystalline polyolefin is essentially a wax. While effective in lowering the melt viscosity of the blend, such waxes do not improve strand quality in extruded articles and the physical properties of such blends are generally inferior to those of higher molecular weight polyolefins. However, low molecular weight crystalline polyolefins, waxes, may be used at low levels in conjunction with the defined polyolefins as viscosity reducers. For very high molecular weight polyolefins, the resulting blends exhibit excellent physical properties but poor processability. In these cases, the addition of a minor amount, e.g. from 2 to 30 phr, based on the ionic polymer of a compatible wax would be advantageous. However, the total amount of wax and defined polyolefins should be in a minor amount in relation to the sulfonated elastomer.

If the molecular weight of the polyolefin is too low, then noncrystalline products or oils result. While such oils classified as paraffinic oils are fairly compatible with the sulfonated elastomer, the resulting blend neither exhibits the acceptable flow behavior for processing nor the requisite physical properties.

The useful polystyrenes for this invention possess an $\overline{M}n$ of from about 40,000 to about 150,000 and $\overline{M}w$ of from about 100,000 to about 500,000. A typical general purpose polystyrene has an $\overline{M}n$ of about 105,000 and an $\overline{M}w$ of about 280,000. These polystyrenes will possess a melt index of from about 1 to about 25 g/10 minutes at 200° C. and 100 psi. (ASTM D-1238-65T, Condition G).

Crystal polystyrene is a rigid, clear, and brittle resin. Typically polystyrene possesses a specific gravity of about 1.05. It has a high modulus, from about 4 to about $5 \times 10^5$ psi. Its Izod impact strength is low at about 0.3 to 0.5 ft-lb/in of notch. Its elongation is limited to about 3%.

Amorphous vinyl polymers, such as polystyrene, are rigid glasses and are very brittle. The impact strengths of these hard, glassy polymers can be improved substantially through the use of the neutralized sulfonated elastomeric polymers of this invention, especially through the process of this invention. The hydroxyalkyl sulfonates are readily mixed with amorphous, brittle vinyl polymers and copolymers. It is then mixed with the neutralizing agent. This permits the formation of a strong, elastic interpenetrating network with the amorphous polymer and thereby allows an additional process whereby impact strength can be improved.

Polypropylene has the advantages of high rigidity and high softening point (about 335° F.), but this crystalline polyolefin possesses poor impact strength, especially at lower temperatures. Blends of neutralized sulfonated elastomeric polymers with polypropylene result in products with improved impact strength, particularly at lower temperatures. These blends further show improved flexibility at low temperatures. One application for blends of this type is ski boots where an excellent combination of flexibility, durability, lightness, easy processability and reasonable cost occurs.

For thermoplastic articles the range of the polyolefinic resin is about 120 to about 900 parts per hundred by weight of the neutralized sulfonated elastomeric polymer, more preferably about 150 to about 400, and most preferably about 150 to about 300.

It is readily apparent that ternary or higher blends of several thermoplastic resins can be employed in this invention. For example, a combination of low density polyethylene and polypropylene with the requisite sulfonated gum provides materials with improved properties for certain applications. The hardness and flexibility of the resulting composition can be controlled by the concentration and types of thermoplastic resins comprising the blend. The addition of a crystalline ethylene-propylene copolymer in conjunction with the thermoplastic resins yields materials with a different physical property-processability balance which might be advantageous for certain applications.

The solid, gel-free hydroxyalkylated, sulfonated polymer is converted into a neutralized sulfonated elastomeric polymer by reacting it with a neutralizing agent. The neutralizing agent is a base such as mono and polyvalent metallic oxides, hydroxides and alkoxides, or salts of weak acids such as carboxylates of which acetates, laurates and stearates are non-limiting examples. Preferred are metal salts of carboxylic acids.

When a metal carboxylate is used to neutralize the polymeric sulfonic acid, a carboxylic acid is released.

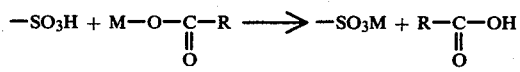

When the polymeric sulfonic acids are neutralized in bulk with the lower molecular weight metal carboxylates, the presence of the generated carboxylic acid, e.g. acetic acid, is undesirable because of odor and possible corrosion. The higher molecular weight carboxylic acids, such as stearic acid, are not odoriferous or corrosive. However, these higher molecular weight carboxylic acids, which are excellent flow improvers at elevated temperatures, also exert deleterious effects upon ionomer physical properties at lower temperatures and so are less desirable than other plasticizers.

The reaction between metal carboxylate and hydroxyalkyl sulfonate produces a mixture of the metal sulfonate and a hydroxyalkyl carboxylate ester in equivalent proportion for complete neutralization.

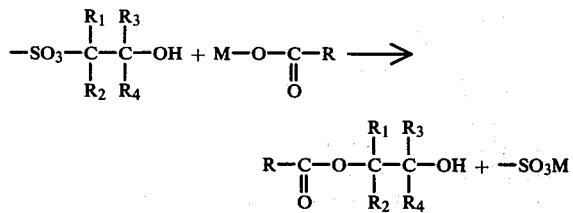

The lower molecular weight hydroxyalkyl carboxylates are not odoriferous or corrosive as the corresponding carboxylic acids. The higher molecular weight carboxylates are not as deleterious to physical properties as are the corresponding carboxylic acids.

The metals which are preferred for the formation of ionic crosslinks of the sulfonated polymer are selected from the group consisting of Groups I-A, II-A, I-B or II-B of the Periodic Table of Elements and lead, aluminum, iron, and antimony. Most preferred are bases and fatty acid salts of zinc, magnesium, barium, sodium and lead.

A metallic hydroxide can be incorporated into the blend composition as a means of further neutralizing any residual free acid in the elastomeric compositions.

The metallic hydroxide is incorporated at a concentration level of about less than 50 parts per hundred based on 100 parts of the neutralized sulfonated elastomeric polymer, wherein the metal ion of the metallic hydroxide is selected from Group II-A of the Periodic Table of Elements such as barium, calcium or magnesium.

The thermoplastic incorporated into the blend compositions of the present invention, in conjunction with the type of elastomeric polymer, the degree of sulfonation, and the metal counterion of the neutralized sulfonated elastomeric polymer and the formed hydroxyalkyl carboxylate ester give materials processable by extrusion or injection molding processes into elastomeric articles having the desirable physical and rheological properties.

Conversion of the uncompounded or compounded hydroxyethyl sulfonate by means of a metallic base or acylate is readily accomplished at elevated temperature, for example 120° C. to 260° C., most preferably, 150° C. to 200° C. These temperatures are readily obtainable in equipment used for processing plastic and elastomeric materials such as Banbury mixers and extruders. Ionomers made by the bulk neutralization of the hydroxyalkyl ester of the sulfonated polymer permits the formulation of compounds with excellent processability for extrusion, injection molding, vacuum forming, compression molding and similar operations. This invention also permits a polymer to be sulfonated at one site and shipped as the hydroxyalkyl ester in a stable, corrosion-free state to a formulator at another site who can then prepare a variety of ionomers best suited to a particular use.

The compounding of the thermoplastic resin with the polymeric hydroxyalkyl sulfonate can be done prior to the addition of the neutralizing agent, wherein the neutralizing agent is added subsequently to the blend of the additives and polymeric hydroxyalkyl sulfonate. Alternatively, the wax and neutralizing agent can be compounded with the polymeric hydroxyalkyl sulfonate at a temperature below about 100° C. After a homogeneous blend has been achieved, the temperature of compounding is increased to a temperature of about 120° C. to about 260° C. in order to effect neutralization.

DETAILED DESCRIPTION

The advantages of both the rheological and physical properties of the blend compositions of the present invention can be more readily appreciated by reference to the following examples and tables.

EXAMPLE 1

EPDM comprising 50 wt. % ethylene, 45 wt. % of propylene and 5 wt. % of 5-ethylidene-2-norbornene and having a Mooney viscosity (ML, 1+8, 212° F.) of about 20 was sulfonated as follows: to a well stirred solution of 800 grams of the polymer and 45.9 ml. of acetic anhydride in 8.0 liters of hexane was slowly added 16.8 ml. of concentrated sulfuric acid. The mixture was stirred for 30 minutes, and the sulfonation reaction was terminated by the addition of 23.2 grams of propylene oxide.

The cement was stabilized by the addition of 2.5 grams of Antioxidant 2246, and the polymer was recovered by steam stripping, washing with water in a Waring blender and drying of the wet polymer crumb on a rubber mill at about 200° F. The product had an elemental sulfur content (Dietert sulfur analysis) of 1.07 wt. % which is equivalent to 33.4 grams of sulfonate per 100 grams of polymer.

A low density polyethylene was blended into the hydroxyalkyl sulfonate at levels of 11, 25 and 33 parts per hundred of hydroxyalkyl sulfonate. Low density polyethylene having a density of about 0.919 was employed. This plastic has a percent crystallinity of approximately 47%.

Mixing was accomplished in a Brabender mixing head at about 150° C. as follows: the hydroxyalkyl sulfonate was charged first followed by incremental portions of the polyethylene. The metal stearate was then added slowly until a good mix had been obtained. Mixing time was about 25 minutes.

The blends were mixed with zinc stearate and lead stearate according to the formulations shown in Table II. Test plaques were molded for 10 minutes at 350° F.

EXAMPLE 2

Into low density polyethylene was blended minor amounts of hydroxypropyl sulfonate EPDM (300 and 900 parts polyethylene/100 hydroxypropyl sulfonate EPDM). The starting materials and the blending procedure are described in Example 1. The blends were mixed with barium stearate (4 equivalents/equivalent sulfonate) and magnesium stearate (5 equivalents/equivalent sulfonate) as shown in Table II (Formulations E and F).

Tensile properties, melt index, and hardness values were determined on test specimens molded 10 minutes at 350° F. Data are given in Table II.

When the hydroxypropyl sulfonate EPDM is blended into a major portion of low density polyethylene only a small loss in tensile properties is experienced over the base polyethylene resin. However, softer and

TABLE II

| BLENDS OF HYDROXYALKYL SULFONATED EPDM AND LOW DENSITY POLYETHYLENE | | | | | | | | |
|---|---|---|---|---|---|---|---|---|
| | A | B | C | D | E | F | G | H |
| FORMULATION | | | | | | | | |
| Hydroxypropyl Sulfonate | 100 | 100 | 100 | 100 | 100 | 100 | — | 100 |
| Low Density Polyethylene | 0 | 11 | 25 | 33 | 300 | 900 | 100 | — |
| Polypropylene | — | — | — | — | — | — | — | 25 |
| Zinc Stearate | 31.7 | 31.7 | 31.7 | — | — | — | — | 21.0 |
| Lead Stearate | — | — | — | 25.9 | — | — | — | — |
| Barium Stearate | — | — | — | — | 45.6 | — | — | — |
| Magnesium Stearate | — | — | — | — | — | 49.0 | — | — |
| ROOM TEMPERATURE | | | | | | | | |
| 100% Modulus, psi | 250 | 230 | 280 | 395 | 890 | 1110 | 1330 | 420 |
| 300% Modulus, psi | 340 | 320 | 430 | 815 | 1085 | 1110 | 1390 | 515 |
| Tensile Strength, psi | 1980 | 1265 | 1555 | 2805 | 1570 | 1620 | 2190 | 1640 |
| Elongation, % | 660 | 750 | 760 | 540 | 510 | 540 | 660 | 520 |
| 70° C. | | | | | | | | |
| 100% Modulus, psi | — | 80 | 110 | 180 | 530 | 110 | 660 | — |
| 300% Modulus, psi | 70 | 70 | 120 | 250 | — | 120 | 760 | — |
| Tensile Strength, psi | 70 | 40 | 105 | 460 | 620 | 105 | 890 | 225 |
| Elongation, % | 1220 | 760 | 490 | 650 | 270 | 490 | 430 | 100 |
| Melt Index (190° C., 250 psi), g/10 minutes | 4.0 | 9.5 | 6.0 | 1.9 | 19.1 | 72.0 | 99.5 | 7.1 |
| Shore A Durometer Hardness | 72 | 68 | 72 | 90 | 90 | 95 | 96 | 80 |
| Compression Set, % ASTM D-395, Method B (25° C., 22 hours, 30 minute reading) | 77 | 82 | 60 | 35 | — | — | — | — |

A control formulation (A) was prepared using hydroxypropyl sulfonate and 3 equivalents of zinc stearate per equivalent of sulfonate. Formulations B and C containing 11 and 25 parts of low density polyethylene were also mixed with 3 equivalents of zinc stearate per equivalent of sulfonate. Formulation D containing 33 parts of low density polyethylene was mixed with 2 equivalents of lead stearate per equivalent of sulfonate.

The tensile strength at both room temperature and 70° C., melt index, room temperature compression set, and Shore A hardness were determined. Data are given in Table II.

In these systems where the rubber phase is the major portion of the blend the use of low density polyethylene imparts improved tensile strength, especially at 70° C., a reduction in melt viscosity (improved melt index), and an improvement in hardness over the base elastomeric gum. The overall properties are determined by the type and concentration of metal carboxylate neutralizing agent, the relative amounts of polyethylene and hydroxyalkyl sulfonate, and the conditions of mixing and processing. A substantial improvement in compression set properties is also obtained through the use of low density polyethylene.

more flexible products are obtained over the base polyethylene resin.

EXAMPLE 3

Twenty five parts of polypropylene (CD-300, Exxon Chemical Co.) and 21 parts of zinc stearate (3 equivalents/equivalent of sulfonate) were blended into 100 parts of the hydroxypropyl sulfonate EPDM of Example 1 according to the general procedure of Example 1. Tensile strength, hardness, and melt index were determined, and data are given in Table II (Formulation H). Specimens for testing were molded 10 minutes/350° F.

The polypropylene blend possessed an improved 70° C. tensile strength, an increased hardness, and an increased melt index over the control (Formulation A).

EXAMPLE 4

Polystyrene (Styron 666, Dow Chemical Co.) was blended with the hydroxypropyl sulfonate EPDM of Example 1 at levels of 400 parts and 900 parts/100 hydroxypropyl sulfonate EPDM according to the procedure of Example 1. Then zinc stearate was blended into the plastic-rubber mix at a level of 31.7 parts/100 hydroxypropyl sulfonate EPDM. Test specimens were molded 10 minutes at 350° F. Tensile strength, hardness, and melt index were determined on these rubber plastic blends and the base polystyrene. Data are given in Table III.

There is virtually no difference in melt index between the blends and the polystyrene. The blends are not as hard and surprisingly impart improved high temperature tensile strength over the base polystyrene.

TABLE III

| Formulation | I | J | K |
|---|---|---|---|
| Hydroxypropyl Sulfonate | — | 100 | 100 |
| Polystyrene | 100 | 900 | 400 |
| Zinc Stearate | — | 31.7 | 31.7 |
| Room Temperature | | | |
| Tensile Strength, psi | 2645 | 3235 | 3060 |
| Elongation, % | V. Low | V. Low | V. Low |
| 70° C. | | | |
| Tensile Strength, psi | 750 | 2960 | 1440 |
| Elongation, % | V. Low | V. Low | V. Low |
| Shore A Durometer Hardness | 99 | 98 | 97 |
| Melt Index (190° C., 250 psi) g/10 minutes | 30.6 | 29.4 | 28.1 |

Since many modifications and variations of this invention may be made without departing from the spirit or scope of the invention thereof, it is not intended to limit the spirit or scope thereof to the specific examples thereof.

What is claimed is:

1. A blend composition comprising:
   (a) a neutralized sulfonated elastomeric polymer having about 15 to about 50 meq of metal sulfonate groups per 100 grams of said polymer said metal sulfonate groups being neutralized with a metal counterion;
   (b) a hydroxyalkyl carboxylate having the formula:

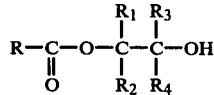

wherein $R$, $R_1$, $R_2$, $R_3$ and $R_4$ are independently selected from the group consisting of hydrogen, $C_1$ to $C_{18}$ straight and branched chain acyclic, alicyclic, aryl, alkylaryl, or arylalkyl groups and functional derivatives thereof and mixtures thereof; and
   (c) about 120 to about 900 parts by weight of a thermoplastic resin per 100 parts of said neutralized sulfonated elastomeric polymer and said hydroxyalkyl carboxylate ester.

2. A composition according to claim 1, wherein said thermoplastic resin is selected from the group consisting of crystalline polyethylene, polypropylene and amorphous vinyl polymers.

3. A composition according to claim 1, wherein said thermoplastic resin is said polyethylene.

4. A composition according to claim 1, wherein said thermoplastic resin has at least about 25% crystallinity.

5. A composition according to claim 1, wherein said thermoplastic resin has an $\overline{M}n$ of about at least 4,000.

6. A composition according to claim 1, wherein said sulfonated elastomeric polymer is derived from an unsulfonated elastomeric polymer selected from the group consisting of Butyl rubber and EPDM terpolymers.

7. A composition according to claim 1, wherein said sulfonated elastomeric polymer is formed from an EPDM terpolymer consisting essentially of about 45 to about 80 wt. % of ethylene, from about 10 to about 53 wt. % of an alpha-olefin, and about 2 to about 10 wt. % of a diene monomer.

8. A composition according to claim 7, wherein said diene is selected from the group consisting of 1,4-hexadiene, dicyclopentadiene, alkylidene substituted norbornenes, alkenyl substituted norbornenes, and tetrahydroindene.

9. A composition according to claim 8, wherein said diene is non-conjugated.

10. A composition according to claim 8, wherein said diene is 1,4-hexadiene.

11. A composition according to claim 7, wherein said diene is 5-ethylidene-2-norbornene.

12. A composition according to claim 1, wherein said metal counterion is selected from the group consisting of lead, aluminum, iron, antimony, and Groups I-A, II-A, I-B and II-B of the Periodic Table of Elements and mixtures thereof.

13. A composition according to claim 1, further including a non-polar wax.

14. A composition according to claim 1, further including a filler.

15. A composition according to claim 1, further including an oil.

16. A blend composition comprising:
   (a) a neutralized sulfonated elastomeric polymer having about 15 to about 50 meq of metal sulfonate groups per 100 grams of said polymer, said metal sulfonate groups being neutralized with a metal counterion;
   (b) a hydroxyalkyl carboxylate ester having the formula:

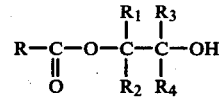

wherein $R$, $R_1$, $R_2$, $R_3$ and $R_4$ are independently selected from the group consisting of hydrogen, $C_1$ to $C_{18}$ straight and branched chain acyclic, alicyclic, aryl, alkylaryl, or arylalkyl groups and functional derivatives thereof and mixtures thereof; and
   (c) about 5 to about 90 parts by weight of a thermoplastic resin per 100 parts of said neutralized sulfonated elastomeric polymer and said hydroxyalkyl carboxylate ester.

17. A composition according to claim 16, wherein said thermoplastic resin is selected from the group consisting of polyethylene and polypropylene.

18. A composition according to claim 17, wherein said thermoplastic resin is said polyethylene.

19. A composition according to claim 16, wherein said thermoplastic resin has at least about 25% cystallinity.

20. A composition according to claim 16, wherein said thermoplastic resin has an $\overline{M}n$ of about at least 4,000.

21. A composition according to claim 20, wherein said thermoplastic resin has a density of at least about 0.88 gms/cc.

22. A composition according to claim 16, wherein said sulfonated elastomeric polymer is derived from an unsulfonated elastomeric polymer selected from the group consisting of Butyl rubber and EPDM terpolymers.

23. A composition according to claim 16, wherein said sulfonated elastomeric polymer is formed from an EPDM terpolymer consisting essentially of about 45 to about 80 wt. % of ethylene, from about 10 to about 53 wt. % of an alpha-olefin, and about 2 to about 10 wt. % of a diene monomer.

24. A composition according to claim 23, wherein said diene is selected from the group consisting of 1,4-hexadiene, dicyclopentadiene, alkylidene substituted norbornenes, alkenyl substituted norbornenes and tetrahydroindene.

25. A composition according to claim 24, wherein said diene is 1,4-hexadiene.

26. A composition according to claim 24, wherein said diene is non-conjugated.

27. A composition according to claim 23, wherein said diene is 5-ethylidene-2-norbornene.

28. A composition according to claim 16, wherein said metal counterion is selected from the group consisting of lead, aluminum, iron, antimony, and Groups I-A, II-A, I-B and II-B of the Periodic Table of Elements and mixtures thereof.

29. A composition according to claim 16, further including a non-polar wax.

30. A composition according to claim 16, further including a filler.

31. A composition according to claim 16, further including an oil.

* * * * *